United States Patent
Nöbauer et al.

(10) Patent No.: US 9,331,838 B2
(45) Date of Patent: May 3, 2016

(54) METHOD FOR SYNCHRONIZING CLOCKS IN NODES OF A VEHICLE NETWORK AND NODE DESIGNED TO PERFORM THE METHOD

(71) Applicants: Josef Nöbauer, Neukirchen-Balbini (DE); Helge Zinner, Straufhain (DE)

(72) Inventors: Josef Nöbauer, Neukirchen-Balbini (DE); Helge Zinner, Straufhain (DE)

(73) Assignee: Continental Automotive GmbH, Hannover (DE)

( * ) Notice: Subject to any disclaimer, the term of this patent is extended or adjusted under 35 U.S.C. 154(b) by 159 days.

(21) Appl. No.: 14/361,600

(22) PCT Filed: Nov. 21, 2012

(86) PCT No.: PCT/EP2012/073151
§ 371 (c)(1),
(2) Date: May 29, 2014

(87) PCT Pub. No.: WO2013/079365
PCT Pub. Date: Jun. 6, 2013

(65) Prior Publication Data
US 2015/0134764 A1    May 14, 2015

(30) Foreign Application Priority Data
Nov. 30, 2011    (DE) .......................... 10 2011 087 472

(51) Int. Cl.
*G06F 15/16*    (2006.01)
*H04L 7/00*    (2006.01)
(Continued)

(52) U.S. Cl.
CPC ............. *H04L 7/0037* (2013.01); *H04J 3/0667* (2013.01); *H04L 67/12* (2013.01); *H04L 7/10* (2013.01); *H04L 2012/40267* (2013.01)

(58) Field of Classification Search
CPC ......... H04L 7/10; H04L 7/0037; H04J 3/0667
See application file for complete search history.

(56) References Cited

U.S. PATENT DOCUMENTS 5,623,483 A    4/1997 Agrawal et al.
5,887,029 A    3/1999 Husted et al.
(Continued)

FOREIGN PATENT DOCUMENTS

EP    0 016 447 A1    10/1980
GB    2 246 677 A    2/1992
WO    WO 2006/044139    4/2006

OTHER PUBLICATIONS

Lim et al. "IEEE 802.1AS Time Synchronization in a Switched Ethernet Based In-Car Network", Nov. 2011, pp. 147-154.
(Continued)

*Primary Examiner* — Moustafa M Meky
(74) *Attorney, Agent, or Firm* — Cozen O'Connor

(57) ABSTRACT

A method for synchronizing clocks in nodes of a vehicle network of a motor vehicle corrects a time difference between a master clock and a slave clock, taking into account transmission delay for a message between a master node and a slave node. At least for a first synchronization of the master clock to a slave clock after the nodes of the vehicle network are started up, a default transmission delay in the slave node is used to correct the time difference, and/or the slave node sending out a Delay Request message, and recording in the master node the time at which Delay Request message is received and the master node sending the time, as a Delay Response message, back to the slave node. In the slave node, the transmission delay for a message between the master node and the slave node is determined.

11 Claims, 1 Drawing Sheet

(51) Int. Cl.
  *H04J 3/06* (2006.01)
  *H04L 29/08* (2006.01)
  *H04L 7/10* (2006.01)
  *H04L 12/40* (2006.01)

(56) References Cited

U.S. PATENT DOCUMENTS

| | | | | |
|---|---|---|---|---|
| 6,357,014 | B1* | 3/2002 | Correia | H04L 12/2602 713/502 |
| 7,362,834 | B2* | 4/2008 | Fuehrer | G06F 1/08 375/354 |
| 8,060,654 | B2* | 11/2011 | Bogenberger | H04J 3/0641 327/144 |
| 2004/0156462 | A1* | 8/2004 | Fuehrer | G06F 1/08 375/354 |
| 2007/0276600 | A1* | 11/2007 | King | G08G 1/042 701/301 |
| 2009/0141699 | A1 | 6/2009 | Goshen et al. | |
| 2010/0131816 | A1 | 5/2010 | Yamamoto et al. | |
| 2011/0153869 | A1 | 6/2011 | Bryant et al. | |

OTHER PUBLICATIONS

Murakami et al. "Improvement of Synchronization Accuracy in IEEE 1588 Using a Queuing Estimation Method", Oct. 12, 2009, ( 5 pages ).

Ingram et al. "Use of IEEE 1588-2008 for a Sampled Value Process Bus in Transmission Substations", May 10, 2011, (6 pages).

Ciufoletti, "Preventing the Collision of Requests From Slave Clocks in the Precision Time Protocol (PTP)", Jun. 1, 2011, pp. 2096-2103.

Zinner et al. "A Comparison of Time Synchronization in AVB and FlexRay in-vehicle Networks", Jul. 7, 2011, (6 pages).

* cited by examiner

METHOD FOR SYNCHRONIZING CLOCKS IN NODES OF A VEHICLE NETWORK AND NODE DESIGNED TO PERFORM THE METHOD

CROSS-REFERENCE TO RELATED APPLICATIONS

This is a U.S. national stage of application No. PCT/EP2012/073151, filed on 21 Nov. 2012, which claims priority to the German Application No. 10 2011 087 472.0, filed 30 Nov. 2011, the content of both incorporated herein by reference.

BACKGROUND OF THE INVENTION

1. Field of the Invention

The invention relates to a method for synchronizing clocks in nodes, for example in the form of control devices, of a vehicle network of a motor vehicle, in which the nodes communicate with one another by a communications protocol not synchronized per se, for example a bus system having an Ethernet protocol, and relates to a node designed to perform the method.

In the synchronization method according to the invention it is provided that a master node having a master clock sends out synchronization messages, which are evaluated in a slave node having a slave clock, wherein the timing signal of the slave node is adapted to the timing signal of the master node, in particular by adjusting the clock oscillator of the slave clock or of the slave node, or adapting the timing signal by other means, for instance by correction timing signals. In addition, in the method proposed according to the invention, the transmission delay for a message between the master node and the slave node is taken into account in correcting a time difference between the master clock and the slave clock.

2. Related Art

GB 2 246 677 A describes an optical terminal operated synchronously on different wavelength channels. When first switched on, the terminal sends out a signal, which is sent back from a star coupler to its own receiver in order to establish the length of the optical path from the receiver to the star coupler, if this has not already been established during installation. From the wavelength and the knowledge of the differential delay per wavelength, the delay is determined for each wavelength of the receiver, thereby achieving wavelength-synchronous operation of the terminal. This is not possible for packet-switched data transmission, however, because of the random delays that arise in this form of transmission.

EP 0 016 447 A1 discloses a method and a device for reconstructing voice data in a packet-switched telecommunications network, in which method and device the delay of a first data packet during transmission from the sender to the receiver is estimated in the active signal period, and this estimate is updated for time synchronization of the sender and the receiver, wherein the sender buffers the data packet for a time that depends on the estimated delay in order to minimize the variance of the data packets. This also has the problem, however, that at the start of communication, synchronization is performed initially on the basis of an estimate obtained from the first data packet, and therefore takes a relatively long time.

U.S. Pat. No. 5,623,483 describes a system for synchronizing a data stream by a control circuit which configures and initializes a buffer circuit to process and receive a data stream. The defined initialization parameters include a maximum acceptable packet loss rate and a maximum acceptable delay. In addition, a packet delay distribution is constructed, which describes the probability of a particular packet delay on the transmission path. This can be selected to be an initial approximation that is refined during operation. A first data packet is then inserted into the buffer in a position that is derived from a calculated delay. Subsequently received data packets, which contain information about their position relative to the first data packet, are slotted into the memory in an appropriate position. The data streams are hence synchronized, but not the clock generators in the sender and receiver, which is not essential for the purpose of transmitting these data streams.

On the other hand there are applications in which it is necessary to use a common time base in order to ensure the time synchronicity of different events (signals). Control devices in a motor vehicle that communicate with one another in a network via bus systems are a specific application example.

The common time base, and hence the time synchronicity of the nodes or networks, can be implemented in principle by the network itself. Bus systems such as FlexRay and MOST, which are currently used in motor vehicles, exist for this purpose and can establish this common time base. In these systems, synchronization times (starting from an initial asynchronicity, for example when the network is started up, to full synchronicity) of less than 100 ms are typical, as are necessary for applications in vehicles. Not all the networks or bus systems, however, have such a communications protocol that is synchronized per se. If the bus system or network that is designed to provide the communications link between the control devices or network nodes cannot, as such, establish the common time base, there is the option of achieving this by special protocols for time synchronization.

The Precision Time Protocol (PTP), based on versions v1 and v2 of standard IEEE1588, and the IEEE802.1AS protocol derived therefrom, are particularly suitable for this purpose and are widely established protocols for synchronizing network nodes that can each be used to establish a packet-based time synchronization between the individual network nodes.

These synchronization protocols are essentially based on there being a single master clock in a network and the other clocks behaving as slave clocks that synchronize themselves to this master clock. With regard to the clock, one network node therefore constitutes a master node to which the other nodes of the network relate as slave nodes (with respect to their clocks). The master clock is here typically the best quality clock in the network. During synchronization, the time offset of the slave clocks with respect to the master clock, and the transmission delays between the adjacent nodes, are determined. These values are then used for a clock correction of the slave clocks or slave nodes.

Unlike the bus systems such as FlexRay or MOST commonly used in motor vehicles, however, such synchronization protocols are not optimized for the first-time synchronization during start-up (restart) of the network, such as occurs, for example, when starting a motor vehicle. Thus the design of these protocols is such that during system start-up they require significantly longer synchronization times in the region of seconds. Synchronization using these PTP/IEEE802.1AS protocols cannot manage to synchronize network nodes or the clocks thereof during system start-up or restart in a synchronization time of less than one second.

The Ethernet version ("Ethernet AVB") considered more closely in the automobile industry and which uses the IEEE802.1AS protocol in order to synchronize network nodes, i.e., in particular the individual control devices in the motor vehicle, also cannot manage synchronization times of less than one second. As already mentioned, this protocol is based on measuring the transmission delays between individual nodes and then incorporating these delays in a clock-offset correction. This known method is performed in two steps.

In a first step, the difference between the master clock and the slave clock is measured. For this purpose, the master clock sends out synchronization messages, which are sent out at a specific time $t_1$ of the master clock, and are received at a time $t_2$ of the slave clock, where the send time $t_1$ of the master clock is transmitted to the slave clock by the synchronization message (either directly in a Sync message or an immediately following Follow-up message, which then jointly form the synchronization message). It is thereby possible, in particular by evaluating two successive synchronization messages, to adapt the clock speed of the slave clock to the clock speed of the master clock. This measurement or evaluation is performed in accordance with the intended standard based on the IEEE802.1 protocol at a time spacing of approximately 7 ms, for example specifically 7.8125 ms, to 64 s, in which the synchronization messages are sent out.

In the known synchronization methods, the transmission path is measured in time in a further step in order to be able to correct a time difference (offset between the clocks and delay arising from the transmission) between the master clock and the slave clock. For this purpose it is provided that the two-way delay, i.e., the time for a round-trip transmission from the slave clock or the slave node to the master clock or the master node, and back, is measured. To do this, the slave clock or the slave node sends out a Delay Request message, which is received by the master clock or master node. In response thereto, the master node or master clock sends out a Delay Response message, which is received in the slave node that sent out the Delay Request message. The respective send and receive times are recorded in the slave clock and the master clock so that it is then possible to determine the delay arising from the sending, and the offset of the slave clock with respect to the master clock. The time difference between the two clocks can thereby be determined and corrected.

This Delay Request cycle described above for correcting the time difference in accordance with the specification in the IEEE802.1AS protocol is only performed once per second, however. In a network having a plurality of nodes, this means that the total synchronization time can increase by one second for each node when the overall system is started. This protocol prevents these messages being sent out more frequently because otherwise the permanent load on the transmission channel in the network would be too great. In addition, an IEEE802.1AS network is initialized such that it configures and segments itself independently. In this regard, each node that is part of the network uses what is known as a "best master clock" (BMC) process in order to establish a best clock in the network or the current network segment. Under the Precision Time Protocol (PTP), each clock saves its properties in a specific data record and shares these properties with the other bus or network users in what are known as Announce messages. All the users or nodes can hence compare the data record of their current clock with the data record of the current master clock in the network, and adjust the clock configuration themselves, with the clock that has the best quality properties being declared the best master clock in the network.

The cyclical execution of this best master clock process by exchanging the Announce messages means that users can be added or removed while operation is in progress, which is also known as hot-plugging. During the restart (start-up) of a network, because of this best master clock process, the best clock is not known to any user, and therefore each user (node) assumes that it itself has the best clock until it learns from the Announce messages that the clocks of other users or nodes in the network are of better quality and uses these as the master clock.

The IEEE802.1AS protocol stipulates that the frequency of sending equals 1 Hz, i.e. the Announce messages are transmitted at a time spacing of just one second. This must again be understood against the background that transmitting this data more frequently in a network results in too great a basic load on the network in normal operation, and therefore the latency of the network would be too great for the actual data transmission if the Announce messages were transmitted at a higher rate.

Since during a restart of the network, the best clock of all the users of the system must be determined first in order to install this clock as the master clock of a master node, the minimum synchronization time is dictated by the number of nodes, because each neighbor transmits the Announce messages cyclically to its neighbors. Thus determining the best clock takes up to one second longer per node in the network. This disadvantage during the restart (start-up or boot-up) of the network is accepted in order to have overall a flexible network that automatically finds its best clock.

SUMMARY OF THE INVENTION

Against this background, it is an object of the present invention to reduce the synchronization times during a restart of the network or system when using a communications protocol that is not synchronized per se.

In the method proposed according to an aspect of the invention for clock synchronization it is provided in particular that at least for a first synchronization of the master clock to one of possibly a plurality of slave clocks or to a multiplicity of slave clocks or to each of the slave clocks after the nodes of the vehicle network are started up, for instance after the network is switched on and/or restarted, a default transmission delay, which preferably is specific to the transmission from the master node to the specific slave node, i.e., depends on the transmission path, is used in a slave node to correct the time difference between the master node and the slave node. The previously mentioned Delay Request cycle, in which the round-trip transmission of a message as a Delay Request message and Delay Response message is evaluated, can thereby be omitted initially during a restart of the system in order to achieve a rapid synchronization of the master clock to the slave clock. This can be done for a first synchronization cycle or a plurality of synchronization cycles, preferably until a reliable synchronization of master clock and slave clock is achieved. This proposal is based on the knowledge that the configuration of the motor vehicle and the in-vehicle network (also referred to below simply as the network) normally does not vary dynamically, and the transmission delays of the messages that are used for time synchronization are practically constant over the entire lifetime of the vehicle. It is hence possible to use a default transmission delay and to limit at least the first synchronization period to the exchange of synchronization messages, and for the subsequent synchronization to use permanently stored default transmission delays for the calculation.

An alternative option, but which preferably can also combine well with the defined method, is that, preferably after receiving a synchronization message, the slave node sends out a Delay Request message, and the time at which it is received is recorded in the master node and is sent back to the slave node by the master node as a Delay Response message, in which slave node is then determined the transmission delay for a message between the master node and the slave node, wherein the frequency of sending the Delay Request messages equals the frequency of sending the synchronization messages, at least for a defined time period after the nodes of the vehicle are started up. This sending out of a Delay Request message and the receiving of the Delay Response message, which jointly is also referred to below as the Delay Request cycle and corresponds to determining the transmission delay of a message by a round-trip transmission between a slave node and the master node, reduces the synchronization time considerably, because the 1 Hz frequency of sending stipulated by the protocol is increased significantly. According to the invention, this is no longer detrimental during the system restart because no other content information can be exchanged anyway until the network nodes in the vehicle network or network are synchronized. Hence all, or a substantial part, of the available transmission capacity can be used initially after the restart of a vehicle network to put the individual users or nodes of the vehicle network into an operational state, which also includes all the clocks of the nodes or users of the network being synchronized.

Whereas normally, in accordance with standard IEEE1588 or standard IEEE802.1AS based thereon, which is also used by the "Ethernet AVB" protocol, the synchronization messages are normally sent out according to a typical time spacing of 10 or 100 ms and in contrast the Delay Request cycle is sent out at a frequency of 1 Hz, it is proposed according to an aspect of the invention to perform the Delay Request cycle according to the second alternative at an increased frequency for a defined short time period that is very short with respect to the normal operating time of the vehicle network during a journey of a motor vehicle. The defined time period can equal, for example, a time of 1 to 100 seconds, preferably approximately 2 to 10 seconds.

This is particularly practical in combination with the use of the default transmission delay described in the first invention alternative in order to achieve directly a first synchronization of the clocks, so that only relatively smaller corrections to the synchronization still need to be made by the subsequent Delay Request cycle, which corrections are usually made in a shorter time than establishing synchronization completely from scratch.

In a particularly preferred embodiment of the proposed method, the default transmission delay can have been measured during a past operation, in particular as described above by sending out a Delay Request message by the slave node and evaluating the time at which it is received in the master node, and can have been stored in the slave node, i.e., in a processing and memory unit of the slave node. Thus the default transmission delay can have been determined in a past switch-on cycle, so that a vehicle already contains the default value for the defined transmission delay when it is delivered to the end customer, and a longer synchronization time only occurs when the vehicle network is started for the very first time (while still at the manufacturer), because the transmission delay must be determined first by performing a Delay Request cycle, if applicable using the standard-compliant reduced frequency of sending.

In this regard, it can additionally be advantageous if the default transmission delay is determined or calculated from a given vehicle configuration. In a vehicle network, the signal transit time is short because of the distances. The significant factor for the delays in the sending out and transmission of messages is the processing speed of the nodes, which is dependent in particular on the hardware and software. This information can be read out by reading the configuration version and firmware version of the nodes involved and using same in a suitably parameterized calculation, so that a default transmission delay can also be determined theoretically according to nodes provided in the vehicle, i.e. the vehicle configuration.

A further reduction in the synchronization time can be achieved if the slave node sends out the Delay Request message immediately after receiving the synchronization message. Here, immediately after receiving the synchronization message is intended to mean according to the invention that the slave node, after receiving and recognizing the synchronization message, sends out the Delay Request message in the next processing step without inserting any further processing steps. The synchronization message here can technically also be formed by two successive messages, namely by a Sync message, which the master node sends out at time $t_1$ of the master clock, and which is received in the slave node at the time $t_2$ of the slave clock, and by a Follow-up message, which is sent out by the master node after the Sync message and contains the time $t_1$ as information, in order that this clock time is available for executing the synchronization algorithm in the slave node. Sending out the Delay Request message immediately after receiving the synchronization message can be done according to the invention either after receiving the Sync message or after receiving the Follow-up message, wherein the sending out after the Sync message then lies between receiving the Sync message and receiving the Follow-up message.

According to a further variant of the method, it can also be provided that the frequency of sending the Delay Request messages (which after the start is initially high and equals the frequency of sending of the synchronization messages) is reduced after the defined time period and/or after the slave clock has been synchronized to the master clock, in order to reduce the load on the transmission channel, i.e., as soon as synchronization is actually achieved or should have been achieved according to the circumstances. The frequency of sending is then preferably reduced to a standard-compliant frequency of sending of one sending out per second, for example (in this operation, the standard-compliant synchronization can then continue in order to maintain clock synchronicity also during operation).

According to an aspect of the invention, in a further variant of the synchronization method, after the nodes of the vehicle are started up, during synchronization of the clocks in the node, instead of the best master clock (BMC) being determined by exchanging Announce messages between the starting-up nodes, wherein each node sends out an Announce message containing information about properties of its clock, and receives and evaluates the Announce messages from other nodes in order to determine the best quality clock and to define the clock to be the master clock, a master clock can be preset that is the master clock for all the nodes when the vehicle system is started, and constitutes the time base to which (at least initially) the other clocks synchronize themselves. All the network nodes hence know, before the system start-up, the best clock, and configure their ports accordingly into the predefined state. After a first synchronization, the best master clock (BMC) process can be executed to determine the best quality clock in the vehicle network or network, with the master clock then being adjusted accordingly during operation.

Alternatively or additionally, it can also be provided that after the nodes of the vehicle are started up, during synchronization of the clocks in the nodes, each node sends out an Announce message containing information about properties of its clock, and receives and evaluates the Announce messages from other nodes in order to determine the best quality clock and to define the clock to be the master clock (performing the best master clock process). In this case, it is provided according to the invention that the frequency of sending the Announce messages equals the frequency of sending the synchronization messages at least for a defined time period after the nodes of the vehicle are started up, so that a substantially faster synchronization can be achieved in comparison with a standard execution of the best master clock process because of the increase in the frequency of sending out. It has also been established in this case according to the invention that in a vehicle network this communications load is manageable during the network restart.

It has also been found that the synchronization cycle, when retaining the Delay Request cycle and the best master clock process, is performed particularly quickly if each slave node sends out the Announce message immediately after sending out the Delay Request message, and the master node sends out the Announce message immediately after sending out the synchronization message, where sending out immediately also means again in this case that in the respective node or the processing unit of the respective node, this is done after the relevant triggering event of that node (sending out the Delay Request message or the synchronization message) without other inserted actions.

In order to reduce the load on the transmission channel also in this case, it can be provided according to the invention that the frequency of sending the Announce messages is reduced after the defined time period and/or after the master clock has been defined, preferably to the standard-compliant frequency of sending of approximately one sending out per second.

The invention also relates to a node in a vehicle network of a motor vehicle having a microprocessor which is configured to implement a communications protocol in order that the node can take part in communication between different nodes in the motor vehicle or the vehicle network. In vehicles, such nodes are often control devices, which communicate in the vehicle in order to exchange certain information such as, for example, sensor data, detected hazardous situations or the like.

It is provided according to the invention that the microprocessor of the node is configured to perform the method described above, or parts thereof, for synchronizing clocks.

The present invention accordingly also relates to a computer readable medium storing program code, which, after installation on a microprocessor of a node of a vehicle network, is suitable for executing the method described above or parts thereof for synchronizing clocks in a vehicle network in which the node is integrated. The program code can be downloaded, for example as firmware, onto the nodes.

BRIEF DESCRIPTION OF THE DRAWINGS

Further advantages, features and possible applications of the present invention are also presented in the following description of an exemplary embodiment and in the drawings, where all the features described and/or depicted separately or in any combination constitute the subject matter of the present invention, irrespective of how they are set out in the claims or the dependency references thereof.

DETAILED DESCRIPTION OF THE PRESENTLY PREFERRED EMBODIMENTS

Figure 1:
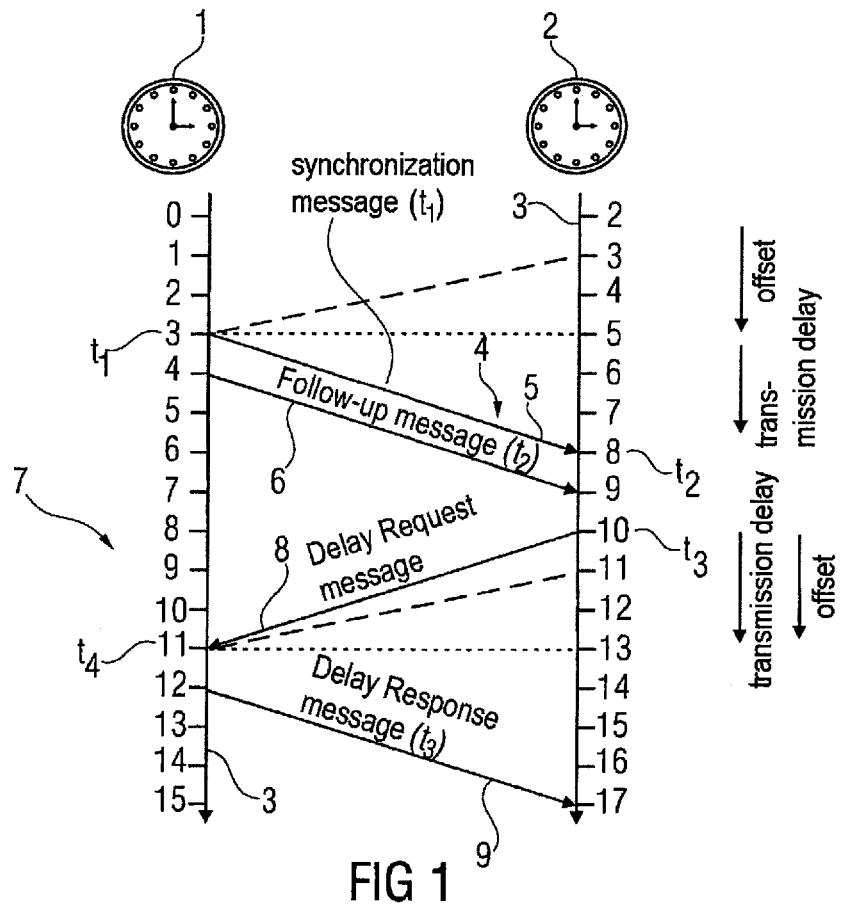
FIG. 1 shows in a timing diagram a synchronization method for synchronizing a slave clock to a master clock.

FIG. 1 shows a master clock 1 of a master node and a slave clock 2 of a slave node, each clock being assigned the time base 3, which is represented in FIG. 1 as a timeline extending in arbitrary units below the master clock 1 and the slave clock 2, respectively.

As part of the synchronization method proposed according to an exemplary embodiment of the invention in a vehicle network in which the nodes communicate with one another via a communications protocol that is not synchronized per se, it is provided that the master node having the master clock 1 sends out synchronization messages 4, which are received by the slave node having the slave clock 2. In the example shown, a synchronization message 4 is composed of two messages. The first message is what is known as a Sync message 5, which the master clock 1 sends out at a time $t_1$, and which the slave clock 2 receives at a time $t_2$. Since not all nodes are capable of incorporating the send time $t_1$ of the Sync message 5 in this message during sending, the master node sends on, shortly after sending out the Sync message 5, a Follow-up message 6, which contains the send time $t_1$ in the time base 3 of the master clock 1. Sending out the Follow-up message 6 can be omitted if the Sync message 5 already contains the time $t_1$.

The send time $t_2$ in the time base 3 of the slave clock 2 is determined in the slave clock.

The master clock 1 sends out these synchronization messages 4 at a frequency of sending that corresponds to a time spacing of typically 10 ms or 100 ms (intervals between 7.8125 ms to 64 s are possible), such that the following relationship applies to two successive synchronization messages k, k+1, given an identical clock speed:

$$t_1^{k+1} - t_1^k = t_2^{k+1} - t_2^k$$

$$t_2^{k+1} - t_1^{k+1} = t_2^k - t_1^k$$

In the evaluation of the synchronization messages 4 in the slave node, the clock speed of the slave clock 2 is then adapted to the clock speed of the master clock 1 until the differences given above are equal.

In order then to correct the time difference between the master clock 1 and the slave clock 2, it is necessary to take into account the transmission delay for a message between the master node 1 and slave node 2, where the time difference between the master clock 1 and the slave clock 2 can be deduced from the known transmission delay for a message.

The fundamental relationship can be obtained from the Delay Request cycle 7 also shown in FIG. 1, in which cycle the slave node having the slave clock 2 sends out a Delay Request message 8 at a time $t_3$, which is received by the master clock 1 at a time $t_4$. In a Delay Response message 9, the master clock 1 sends back the receive time $t_4$ to the slave clock 2. Thus overall, including the synchronization messages, a round-trip transmission of a message from the slave clock 2 to the master clock 1, and from the master clock 1 to the slave clock 2, is achieved, wherein in the example shown the times $t_1$, $t_2$ and $t_3$, $t_4$ are used for this cycle.

Assuming a symmetrical transmission in both communications directions, the transmission delay is defined by the "Delay" equation shown below:

$$\text{Delay} = \frac{(t_2 - t_1) + (t_4 - t_3)}{2}.$$

Once the "Delay" is known, the time difference between the master clock and the slave clock can be determined from the relationship for the "Offset":

$$\text{Offset} = \frac{(t_2 - t_1) - (t_4 - t_3)}{2}.$$

In standard IEEE802.1AS, however, the Delay Request cycle 7 is executed only at a frequency of 1 Hz, i.e. a Delay Request message 8 is sent out only once per second. For a system start-up, i.e., a restart of all nodes of the vehicle network, this results in a very long synchronization time.

It is therefore proposed according to an exemplary embodiment of the invention to use for the transmission delay ("Delay") a default transmission delay that is already defined for the system at the start-up. The offset between the master clock 1 and the slave clock 2 can hence be derived easily from the receipt of a synchronization message 5, as is shown by the following equation:

$$\text{Offset} = (t_2 - t_1) - \text{Delay}$$

Hence once the synchronization message 4 has been received for the first time, for example after the Sync message 5 has been received, containing the value of the default transmission delay (as the variable "Delay"), clock synchronization can take place already without having to wait to calculate the delay. This means that the actual execution of the Delay Request cycle 7 could be omitted or only used for correcting the delay.

The default transmission delay can be determined by different means. One suitable option is to adopt the result of a Delay Request cycle 7 of the previous, or a previous, switch-on cycle (power cycle) of the network. Another option is to determine an initial value on the basis of the given vehicle configuration, i.e., taking into account the nodes involved and the hardware and software of the nodes.

If a master clock 1 that sends out the synchronization messages 4 is known, synchronization of the clocks can thus be achieved according to the invention already after a few milliseconds.

In addition, it can be proposed also during a system restart to execute the full synchronization cycle as shown in FIG. 1, i.e., both send out a synchronization message 4 and perform a Delay Request cycle 7, wherein the Delay Request message 8 is sent out immediately after receiving the synchronization message 4, i.e., the frequency of sending the Delay Request messages 8 equals the frequency of sending the synchronization messages 4 at least for a defined time period after the nodes of the vehicle are started up (restarted). The complete synchronization cycle (including determining the transmission delay in the Delay Request cycle 7) can thereby also be performed in a time that is significantly shorter compared with the case in which the frequency of sending the Delay Request messages 8 is significantly lower than the frequency of sending the synchronization messages 4.

The high rate at which the Delay Request cycles 7 are performed can be terminated according to the invention after a defined time period between 1 and 100 seconds, preferably approximately 2 to 10 seconds, or after synchronization is achieved.

In addition, under the IEEE802.1AS protocol, a best master clock (BMC) process is normally carried out in which the network determines automatically the best quality clock 1, 2 in its segment and declares it the master clock 1. For this purpose, all the nodes 10, 11 in the vehicle network exchange what are known as Announce messages 12, in which stored properties of the clocks 1, 2 of the nodes can be transmitted. By evaluating these Announce messages 12, the best clock can hence be declared the master clock 1 in the network. Usually, however, the Announce messages 12 are also sent out only at a frequency of 1 Hz.

Figure 2:
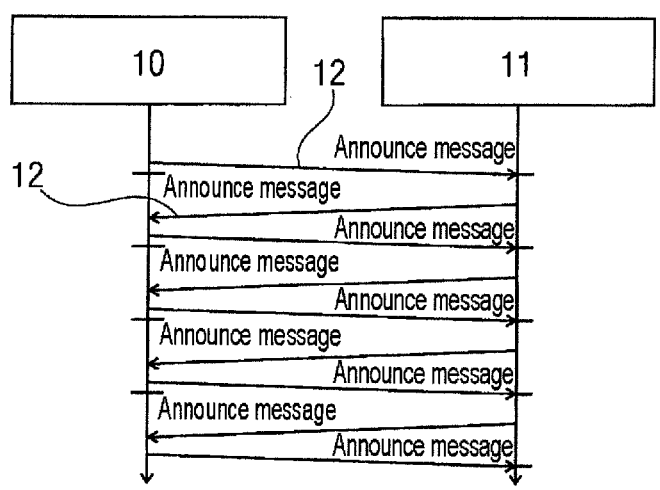
FIG. 2 shows in a timing diagram the execution of the best master clock process for determining the best quality clock in the network.

Since during a system restart this means that determining the master clock 1 takes a very long time and hence the first synchronization cannot be performed quickly, according to an embodiment of the invention and using the same inventive idea as in the synchronization described above, a master clock 1 is initially preset for the system restart, so that the best master clock (BMC) process shown in FIG. 2 does not need to be carried out for the first synchronization of the nodes that are part of the network.

Alternatively or additionally, it is likewise possible during a system restart to perform the best master clock process shown in FIG. 2 by exchanging the Announce messages for a predetermined time period at an increased frequency that preferably equals the frequency of sending of the synchronization messages 4, which process can take place, for instance, immediately after performing the Delay Request cycle 7.

If, on the other hand, the best clock (also referred to as the grandmaster) is already set as a clock initially, all the network users know their role as master or slave and immediately send out messages according to their role during the system restart. Thus the synchronization messages 4 are sent in the role of the master clock 1, and the Delay Request messages 8 are sent in the role of the slave clock 2. The Announce messages 12 can be omitted initially during the system restart, which results in a particularly fast synchronization.

During the rest of the process, the Announce messages 12 can then be sent in accordance with the standard in order to declare the best clock at the time in the running system to be the master clock 1.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for synchronizing clocks (1, 2) in nodes of a vehicle network of a motor vehicle, in which the nodes communicate with one another by a communications protocol which is not synchronized per se, the method comprising:

a master node having a master clock (1) sending out synchronization messages;

a slave node having a slave clock (2) evaluating the synchronization messages;

adapting a timing signal of the slave clock (2) to a timing signal of the master clock (1);

correcting a time difference between the master clock (1) and the slave clock (2), taking into account transmission delay for a message between the master node and the slave node;

at least for a first synchronization of the master clock (1) to a slave clock (2) after the nodes of the vehicle network are started up, using a default transmission delay in the slave node to correct the time difference between the master node and the slave node, and/or the slave node sending out a Delay Request message (8), and recording in the master node the time (t4) at which Delay Request message (8) is received and the master node sending the time (t4), as a Delay Response message (9), back to the slave node; and determining, in the slave node, the transmission delay for a message between the master node and the slave node, wherein the frequency of sending the Delay Request messages (8) equals the frequency of sending the synchronization messages (4), at least for a defined time period after the nodes of the vehicle are started up.

2. The method as claimed in claim 1, wherein the default transmission delay has been measured during a past operation and has been stored in the slave node.

3. The method as claimed in claim 1, further comprising determining the default transmission delay from a given vehicle configuration.

4. The method as claimed in in claim 1, wherein the Delay Request message (8) is sent out immediately after receipt of the synchronization message (4).

5. The method as claimed in in claim 1, further comprising reducing the frequency of sending the Delay Request messages (8) after the defined time period and/or after the slave clock (2) has been synchronized to the master clock (1).

6. The method as claimed in in claim 1, further comprising presetting the master clock (1) in the nodes after the nodes of the vehicle are started up, during synchronization of the clocks (1, 2).

7. The method as claimed in in claim 1, further comprising, after the nodes of the vehicle are started up, during synchronization of the clocks (1, 2) in the nodes, each node sending out an Announce message (12) containing information about its clock, and receiving and evaluating the Announce messages (12) from other nodes to determine the best quality clock (1, 2) and to define said clock to be the master clock (1), wherein the frequency of sending the Announce messages (12) equals the frequency of sending the synchronization messages (4) at least for a defined time period after the nodes of the vehicle are started up.

8. The method as claimed in claim 7, wherein each slave node sends out the Announce message (12) immediately after sending out a Delay Request message (8), and the master node sends out the Announce message (12) immediately after sending out a synchronization message (4).

9. The method as claimed in claim 8, further comprising reducing the frequency of sending the Announce messages (12) after the defined time period and/or after the master clock has been defined.

10. A node in a vehicle network of a motor vehicle having a microprocessor configured to implement a communications protocol such that the node can take part in communication between different nodes in the motor vehicle, wherein the microprocessor is configured to perform the method for synchronizing clocks (1, 2) as claimed in claim 1.

11. A computer-readable medium storing program code, which, when executed by a microprocessor of a node of a vehicle network, is configured to execute the method for synchronizing clocks (1, 2) as claimed in claim 1 in a vehicle network in which the node is integrated.

* * * * *